US006725730B2

(12) United States Patent
Bollinger, Jr.

(10) Patent No.: US 6,725,730 B2
(45) Date of Patent: Apr. 27, 2004

(54) CRANE TEST WEIGHT ASSEMBLY AND METHOD

(76) Inventor: Charles L. Bollinger, Jr., 21795 Dohm Ranch La., Loranger, LA (US) 70446

( * ) Notice: Subject to any disclaimer, the term of this patent is extended or adjusted under 35 U.S.C. 154(b) by 2 days.

(21) Appl. No.: 10/140,002

(22) Filed: May 7, 2002

(65) Prior Publication Data

US 2003/0037623 A1 Feb. 27, 2003

Related U.S. Application Data

(60) Provisional application No. 60/289,070, filed on May 7, 2001.

(51) Int. Cl.7 .................................................. G01N 3/02

(52) U.S. Cl. ............................................ 73/856; 73/831

(58) Field of Search .......................... 73/826, 831, 853, 73/855, 856, 862.381, 862.391

(56) References Cited

U.S. PATENT DOCUMENTS 4,697,458 A * 10/1987 Billstein ...................... 73/862
4,778,325 A * 10/1988 Stolzer et al. .............. 414/276
5,645,181 A * 7/1997 Ichiba et al. ................ 212/281
6,578,441 B1 * 6/2003 Jurenka et al. ............ 73/865.9

* cited by examiner

*Primary Examiner*—Max H Noori
(74) *Attorney, Agent, or Firm*—Garvey, Smith, Nehrbass & Doody, L.L.C.; Charles C. Garvey, Jr.

(57) ABSTRACT

A solid weight load testing system is disclosed for testing the load capacity of a crane. The apparatus includes a holder that includes a platform and a post, the post having upper and lower end portions and being structurally connective at its lower end portion to the platform. A plurality of weights are selectively placed upon the holder by a user in order to arrive at a selected capacity. Each weight has a central opening that is sized and shaped to fit the post as the weight is lowered to the platform. A pair of lifting eyes are provided on each plate, the lifting eyes being mounted to the periphery of a weight on a line that intersects the center of the weight opening. An attachment portion on the top of the post enables a connection to be perfected between the holder and a crane to be load tested. A crane lift line is rigged to the attachment portion after a selected plurality of weights have been added to the holder. The lifting eyes are peripherally positioned on the weight and extend generally away from the periphery of each weight so that the lifting eyes do not interfere with stacking of multiple of the weights.

10 Claims, 3 Drawing Sheets

CRANE TEST WEIGHT ASSEMBLY AND METHOD

CROSS-REFERENCE TO RELATED APPLICATIONS

Priority of U.S. Provisional Patent Application Ser. No. 60/289,070, filed May 7, 2001, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the testing of the load capacity of a crane. More particularly, the present invention relates to an improved solid weight load testing system for satisfying the load testing requirements of cranes, providing a system that is unique and specifically designed to provide a variety of weights with minimal handling and down time for equipment being tested.

2. General Background of the Invention

The load testing requirements of cranes require the utilization of a plurality of weights, the most common type and use being water weight. Water bags require special storeage arrangements. Additional items such as dynamometer, pumps, hoses, stoppers, patch material, etc. must be maintained on hand in order to service these water bags during crane testing. Water weights in certain working environments can eventually deteriorate and require complete replacement.

The dynamometers that are used with water weights require a certification about every six months, which is costly to maintain, especially in an offshore marine environment.

BRIEF SUMMARY OF THE INVENTION

A solid weight load testing system for testing the load capacity of a crane includes a holder that has a platform and a post, the post having upper and lower end portions and being structurally connected at its lower end portion of the platform.

A plurality of weights are provided that can be selectively placed and stacked upon the holder. Each weight provides a central opening that is sized and shaped to fit the post as the weight is lowered upon the post to the platform.

A pair of spaced apart lifting eyes are provided on each plate, the lifting eyes being mounted on the periphery of a weight and can be positioned along a line that intersects the center of the weight opening.

An attachment portion is provided on the top of the post for enabling a connection to be perfected between the holder and a crane to be tested.

A crane having a lift line can be rigged to the attachment portion after a selected plurality of weights have been added to the holder.

The lifting eyes are peripherally positioned on the weights and extend generally away from the periphery of the weights. In this manner, the lifting eyes do not interfere with stacking of multiple of the weights upon the holder.

The weights and their lifting eyes are so positioned that some of the weights can be stacked upon other of the weights wherein the lifting eyes of some weights are oriented about 90 degrees apart with reference to the central longitudinal axis of the post.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figures 1, 2, 3, 4, 5, 6, 7, 8, 9, 10:
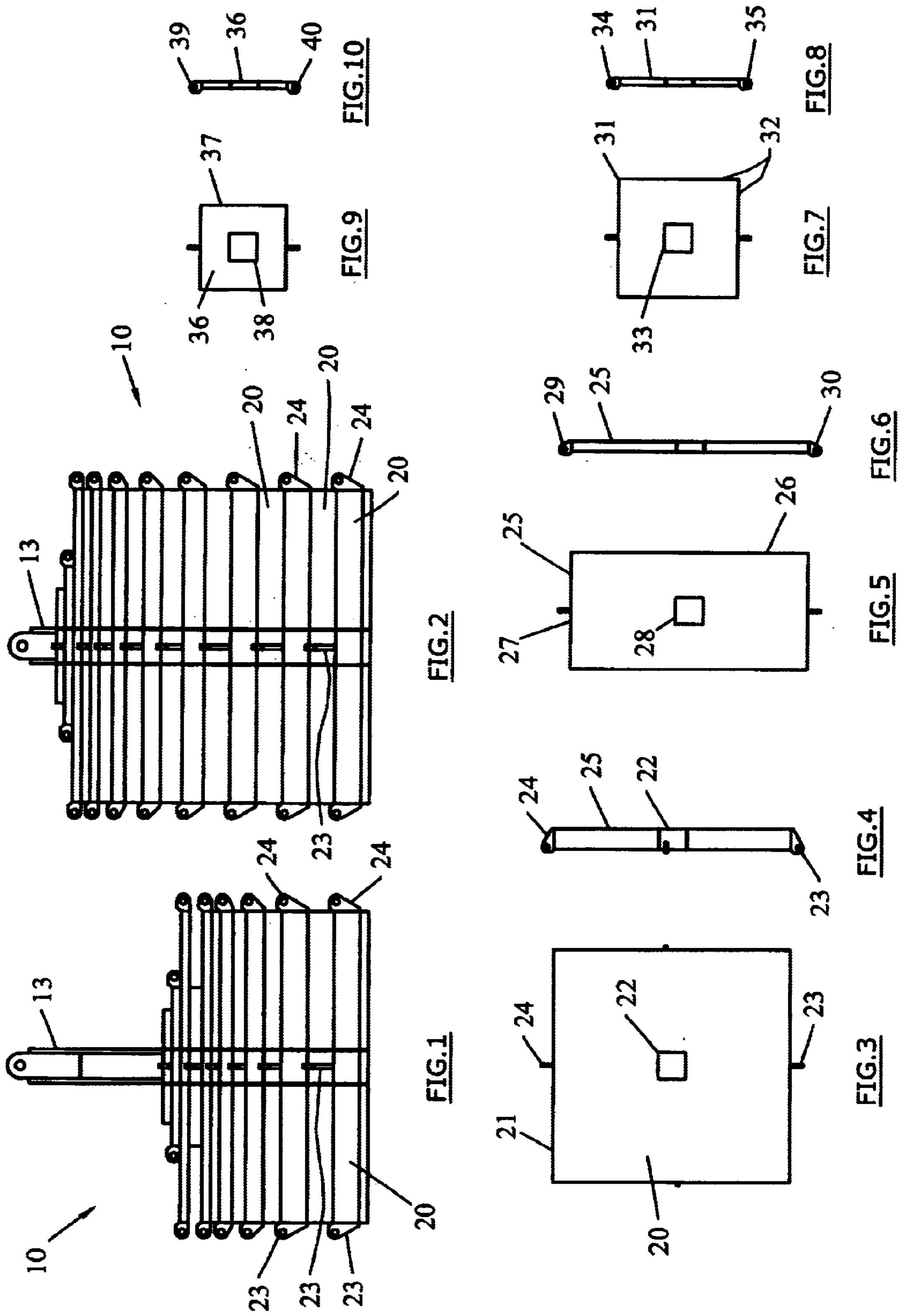
FIG. 1 is a side elevation view of the preferred embodiment of the apparatus of the present invention showing a thirty-ton set.
FIG. 2 is a side elevation view of the preferred embodiment of the apparatus of the present invention showing a fifty-ton set.
FIG. 3 is fragmentary top view of a typical weight.
FIG. 4 is a side view of a typical weight.
FIG. 5 is a top view of a half weight.
FIG. 6 is a side view of a half weight.
FIG. 7 is a top view of a quarter weight.
FIG. 8 is a side view of a quarter weight.
FIG. 9 is a top view of an eighth weight.
FIG. 10 is a side view of an eighth weight.
Figure 11:
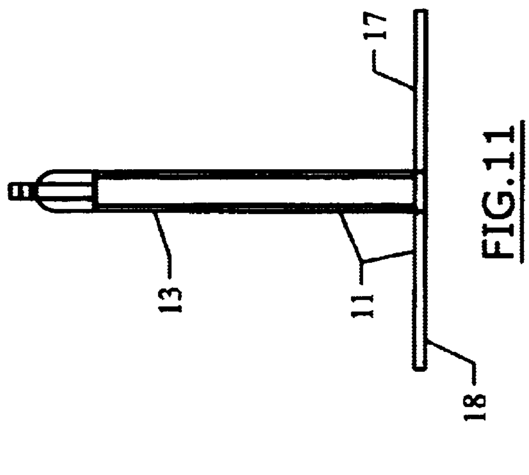
FIG. 11 is a front elevation view of the holder portion of the preferred embodiment of the apparatus of the present invention.
Figure 12:
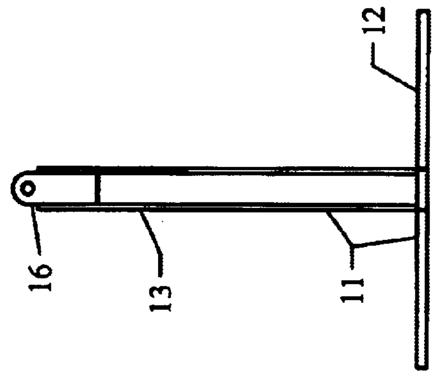
FIG. 12 is a side view of the holder portion.
Figure 13:
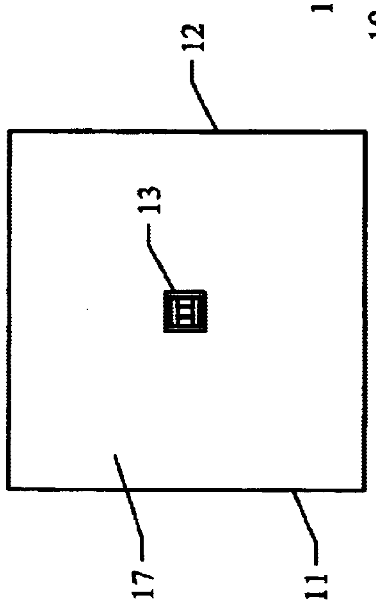
FIG. 13 is a top view of the holder portion.
Figure 14:
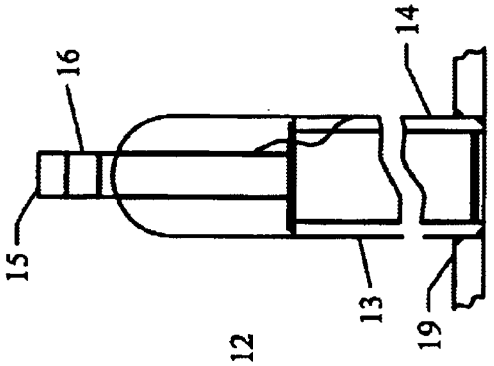
FIG. 14 is an enlarged view showing the post details for the holder.
Figure 15:
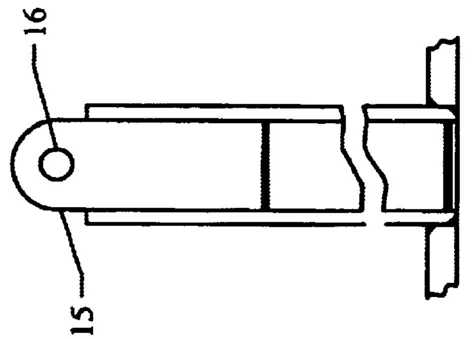
FIG. 15 is another elevation view showing post details for the holder.
Figure 16:
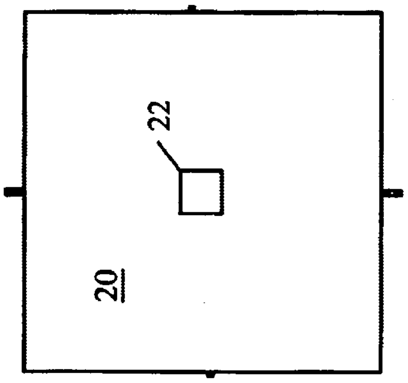
FIG. 16 is a top view of a typical weight.

Solid test weight assembly 10 is shown in FIGS. 1 and 2. The apparatus 10 includes a holder 11 (see FIGS. 11–15) that includes a platform 12 and a post 13. Post 13 has a lower end portion 14 and an upper end portion 15. An opening 16 is provided at the upper end portion 15 for attaching a shackle or other rigging. A connection can thus be formed between a crane lift line and the post 13 at opening 16 for testing of the crane load carrying capacity.

The platform 12 has an upper surface 17 and a lower surface 18. A connection 19 can be a welded connection for connecting post 13 to platform 12.

In FIGS. 3–4, a typical weight 20 is shown. The typical weight 20 can be a square or rectangular plate-like member, having a periphery 21. A central opening 22 is preferably square, corresponding in shape to the cross section of post 13 as shown in the top view of FIG. 13. In this fashion, the typical weight 20 or a plurality of weights 20 can be stacked upon platform 12 by lifting each selected weight 20 and lowering it over the upper end portion 15 of post 13 and then downwardly until it contacts upper surface 17 of platform 12.

In order to handle each particular typical weight 20, a pair of spaced apart lifting eyes 23, 24 are provided. These lifting eyes 23, 24 are on exact opposite sides of weight 20 and can be on a line that intersects the central axis of opening 22 as shown in FIG. 3.

Figure 17:
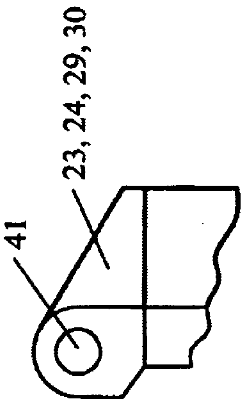
FIG. 17 is a sectional view taken from FIG. 16 and illustrating a pad eye or lifting eye detail.
Figure 18:
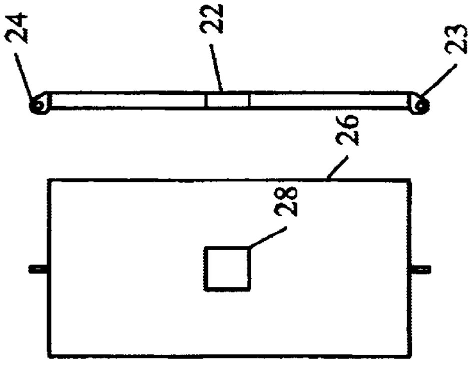
FIGS. 18–20 are additional top views showing the half weight, quarter weight and eighth weight portions of the present invention.
Figure 19:
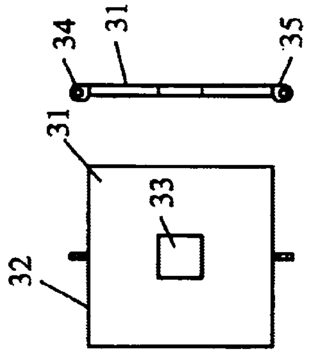
Figure 20:
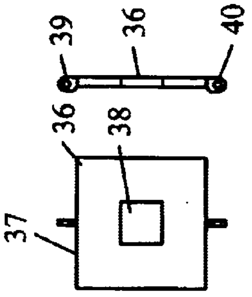

The lifting eyes 23, 24 are shown more particularly in the detail view of FIG. 17. Each lifting eye 23, 24 provides a central opening 41 that enables rigging to be attached to the lifting or pad eye 23, 24 at opening 41 using shackles or other selected rigging.

The system 10 of the present invention provides numerous weights of different configurations. One weight is the typical weight 20 of FIGS. 3 and 4. In FIGS. 5 and 6, a half weight 25 is provided. Half weight 25 has a pair of spaced apart, generally parallel, long edge portions 26 and a pair of spaced apart, generally parallel, short edge portions 27.

The long and short edge portions 26, 27 define a periphery for half weight 25. Half weight 25 has a central, preferably square opening 28 that corresponds in shape to the configuration of post 13 when viewed in the top view of FIG. 13. As with the typical weight 20, half weight 25 has a pair of spaced apart lifting eyes 29, 30 that are used for lifting and transporting half weight 25. The lifting eyes 29, 30 are basically of the same construction as the lifting eyes 23, 24 of typical weight 20, and correspond to the detail shown in FIG. 17.

A quarter weight 31 is shown in FIGS. 7 and 8. The quarter weight 31 has a periphery 32, a central opening 33, and a pair of spaced apart lifting eyes 34, 35. As with the weights of FIGS. 3–6, quarter weight 31 provides lifting eyes 34, 35 that are on opposing sides of the weight 31 and on a line that intersects the central axis of opening 33.

An eighth weight 36 shown in FIGS. 9–10 provides a periphery 37, central opening 38, lifting eyes 39, 40. The lifting eyes 39, 40 are on opposite sides of the eighth weight 36 and can be on a line that intersects the central axis of opening 38.

For each of the weights shown in FIGS. 3–10, their respective central openings are sized and shaped to fit post 13 so that a selected number of weights of different size, thickness and configuration can be placed upon the post until they rest upon and stack upon platform 11 as shown in FIGS. 1 and 2.

Parts List

The following is a list of suitable parts and materials for the various elements of the preferred embodiment of the present invention.

| PART NUMBER | DESCRIPTION |
|---|---|
| 10 | solid test weight assembly |
| 11 | holder |
| 12 | platform |
| 13 | post |
| 14 | lower end |
| 15 | upper end |
| 16 | opening |
| 17 | upper surface |
| 18 | lower surface |
| 19 | connection |

-continued

| PART NUMBER | DESCRIPTION |
|---|---|
| 20 | typical weight |
| 21 | periphery |
| 22 | central opening |
| 23 | lifting eye |
| 24 | lifting eye |
| 25 | half weight |
| 26 | long edge |
| 27 | short edge |
| 28 | central opening |
| 29 | lifting eye |
| 30 | lifting eye |
| 31 | quarter weight |
| 32 | periphery |
| 33 | central opening |
| 34 | lifting eye |
| 35 | lifting eye |
| 36 | eighth weight |
| 37 | periphery |
| 38 | central opening |
| 39 | lifting eye |
| 40 | lifting eye |
| 41 | opening |

The foregoing embodiments are presented by way of example only; the scope of the present invention is to be limited only by the following claims.

What is claimed is:

1. A solid weight load testing system for testing the load capacity of a crane, comprising;

a) a holder that includes a platform and a post, the post having upper and lower end portions and being structurally connected at its lower end portion to the platform;

b) a plurality of weights that can be selectively placed upon the holder, each weight having a central opening sized and shaped to fit the post as the weight is lowered to the platform;

c) a pair of spaced apart lifting eyes on each plate, the lifting eyes being mounted on the periphery of a weight and on a line that intersects the center of the weight opening;

d) an attachment portion on the top of the post for enabling a connection to be perfected between the holder and a crane to be tested;

e) a crane having a lift line that is rigged to the attachment portion after a selected plurality of weights have been added to the holder; and f) wherein the lifting eyes are peripherally positioned on the weight and extending generally away from the periphery of the weight so that the lifting eyes do not interfere with stacking of multiple of the weights; and g) the weights and their lifting eyes being so positioned that some weights can be stacked upon other of the weights wherein the lifting eyes of separate plates are oriented about ninety degrees apart with reference to the central longitudinal axis of the post.

2. The apparatus of claim 1 wherein the weights include full, and half weights.

3. The apparatus of claim 1 wherein the weights include full, half and quarter weights.

4. The apparatus of claim 1 wherein the weights include full, half, quarter weights, and eighth weights.

5. The apparatus of claim 1 wherein the weights each include a periphery that includes parallel spaced apart edges that carry said lifting eyes.

6. The apparatus of claim 1 wherein at least some of the weights have a generally rectangular shape.

7. The apparatus of claim 1 wherein at least some of the weights have a generally square shape.

8. The apparatus of claim 1 wherein the platform has an area that is at least as large as the area of the largest weight.

9. The apparatus of claim 1 wherein the post has a vertical dimension that is long enough so that at least 10 weights can fit in between the platform and the attachment portion of the post.

10. A solid weight load testing system for testing the load capacity of a crane, comprising;

a) a holder that includes a platform and a post, the post having upper and lower end portions and being structurally connected at its lower end portion to the platform;

b) a plurality of weights of varying size that are stacked upon the holder, each weight having a central opening sized and shaped to fit the post as the weight is lowered to the platform;

c) a pair of spaced apart lifting eyes on each plate, the lifting eyes being mounted on the periphery of a weight and on a line that intersects the center of the weight opening, wherein the lifting eyes of one weight are positioned away from the lifting eyes of the plate upon which it is stacked;

d) an attachment portion on the top of the post for enabling a connection to be perfected between the holder and a crane to be tested;

e) a crane having a lift line that is rigged to the attachment portion after a selected plurality of weights have been added to the holder; and f) wherein the lifting eyes are peripherally positioned on the weight and extending generally away from the periphery of the weight so that the lifting eyes do not interfere with stacking of multiple of the weights; and g) the weights and their lifting eyes being so positioned that some weights can be stacked upon other of the weights wherein the lifting eyes of separate plates are oriented about ninety degrees apart with reference to the central longitudinal axis of the post.

* * * * *